United States Patent Office 3,678,009
Patented July 18, 1972

3,678,009
THERMOCURABLE CRYSTALLINE POLYURE-
THANES BASED ON BRANCHED POLYESTERS
Friedrich Lohse, Allschwil, Rolf Schmid, Reinach, Basel-
land, Willy Fisch, Binningen, and Hans Batzer, Arles-
heim, Switzerland, assignors to Ciba-Geigy AG, Basel,
Switzerland
No Drawing. Filed Dec. 9, 1969, Ser. No. 883,628
Claims priority, application Switzerland, Dec. 16, 1968,
18,755/68
Int. Cl. C08g 22/12, 22/18
U.S. Cl. 260—75 NP                                 16 Claims

ABSTRACT OF THE DISCLOSURE

Thermocurable composition which comprises (a) slightly branched polyesters possessing terminal hydroxyl groups having an average molecular weight of about 1200 to about 10,000, and (b) a diisocyanate with 0.9 to 1.1 equivalents of isocyanate groups being employed in each case per 1 equivalent of hydroxyl group. The compositions are useful as dipping resins, casting resins, laminating resins, impregnating resins, coating agents, sealing compositions, potting and insulating compositions for the electrical industry, or as adhesives.

---

It is known that it is possible to obtain crosslinked polyurethane plastics by polyaddition of dihydric long-chain alcohols to diisocyanates in the presence of trihydric alcohols as crosslinking agents.

The incorporation of long-chain diols, for example polyether glycols or long-chain polyesters containing alcohol end groups, leads to moulded materials of high flexibility and toughness.

Polyurethane plastics with similar favourable technical properties can be obtained if instead of dihydric long-chain alcohols containing admixed tris-hydroxy compounds, branched long-chain polyether glycols are employed, such as are for example obtained by addition of ethylene oxide or propylene oxide to triols, such as glycerine or trimethylolpropane.

Instead of using such branched polyether glycols, good results can also be achieved by using slightly branched polyesters containing alcohol end groups, which are obtainable from dicarboxylic acids and diols with the addition of small amounts of a tris-hydroxy compound.

To the extent that crystalline polyurethane plastic products are obtained from diisocyanates and long-chain dihydroxy or trihydroxy compounds in this known polyadduct formation, the products possess relatively low crystallisation transition temperature (CTT). The CTT of the fully cured mechanically high-grade moulded materials is in all cases below 60 to 80° C. Above this temperature the moulded materials show rubbery-elastic behaviour and exhibit only low strength values, which is very disadvantageous for most applications.

It has now been found that by polyaddition of certain slightly branched-chain polyesters, possessing terminal hydroxyl groups, obtained from a small proportion of an at least trihydric polyol or polycarboxylic acid (starting molecule) and a main proportion of succinic acid and butane-1,4-diol, to diisocyanates, crystalline polyurethane plastic products are obtained which show an extremely high work required for a change of shape (deformation energy). Furthermore they possess, especially after prior stretching, high mechanical strength, good flexibility and elastic behaviour.

Above all, the new polyadducts as a rule show a surprisingly high CTT of above 80° C. in comparison to poly-adducts which are derived from the same diisocyanate and other polyesters, containing terminal hydroxyl groups, from the same homologous series (for example, polyesters from succinic acid and ethylene glycol or hexanediol or from adipic acid and butanediol using the same polyfunctional starting molecule).

The polyesters, possessing terminal hydroxyl groups, obtained from succinic acid and 1,4-butanediol which are used for the polyaddition must be relatively slightly branched, that is to say the recurring structural element of formula

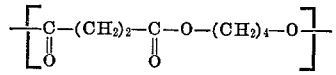

should, in the average polyester molecule, amount to 98 to 90 mol percent, whilst the difference from 100 mol percent is attributable to the polyfunctional starting molecule responsible for the branching (trifunctional or polyfunctional polyalcohol or polycarboxylic acid).

Furthermore the average molecular size of the polyester must lie within certain limits (molecular weight about 1,200 to about 10,000). The stoichiometic ratio of reagents must furthermore be so chosen that 0.9 to 1.1 equivalents of isocyanate groups of the diisocyanates are employed per 1 equivalent of hydroxyl groups of the polyester (as well as of polyhydroxy compounds which may optionally be additionally used as crosslinking agents).

The subject of the present invention is hence a process for the manufacture of high molecular, crosslinked, crystalline polyadducts possessing urethane groups, characterised in that (a) slightly branched polyesters possessing terminal hydroxyl groups, having an average molecular weight of about 1,200 to about 10,000, which consist of 98 to 90 mol percent of the structural element of formula (I) 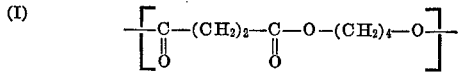

and (b) diisocyanates, are reacted with warming to form a polyadduct, with 0.9 to 1.1 equivalents of isocyanate groups being employed in each case per 1 equivalent of hydroxyl group. The manufacture of the slightly branched succinic acid butane-1,4-diol polyester (a) possessing hydroxyl end groups can be carried out according to the following reaction equation:

(II)
R—(OH)$_y$ + $(y.z)$HOOC—(CH$_2$)$_2$—COOH + $(y.z)$HO—(CH$_2$)$_4$—OH

↓

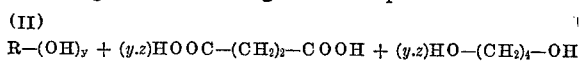 + $2(y.z).$H$_2$O wherein R denotes the hydrocarbon residue of a y-functional aliphatic or cycloaliphatic polyalcohol obtained by separating off the hydroxy groups, y-denotes a number having a value of 3 or 4, preferably 3, and z, which denotes the average number of structural elements

per linear side chain is so chosen that the average molecular weight of the polyester is about 1,200 to about 10,000. As used herein the expression "(y·z)" means the product of y and z.

Instead of succinic acid, it is also possible to employ succinic anhydride in accordance with the following equation:

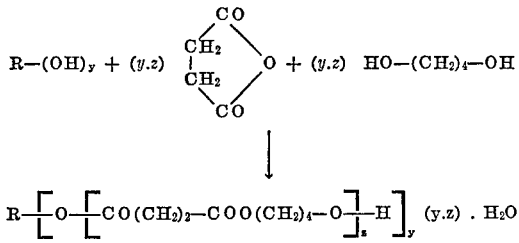

Polyhydric polyalcohols of formula $R-(OH)_y$ which serve as starting molecules are for example glycerine, 1,1,1-trimethylolpropane, 1,1,1-trimethylolethane, hexane-1,2,6-triol, hexane-2,4,6-triol, butane-1,2,4-triol, 3-hydroxymethyl-2,4-dihydroxypentane, pentaerythritol and 3,4,8-trihydroxy-tetrahydrodicyclopentadiene.

In the above reaction equations, it is also possible to choose a polycarboxylic acid of formula $R_1(COOH)_y$ as the starting molecule, wherein $R_1$ is the y-valent hydrocarbon residue of a polycarboxylic acid with y carboxyl groups (y as a rule being 3 or 4). 1 mol of the at least trivalent poly carboxylic acid must in this case always be reacted with (y·z) mols of succinic acid and (y·(z+1)) mols of butanediol.

The polyesters thus obtained can be represented by the average formula (III)

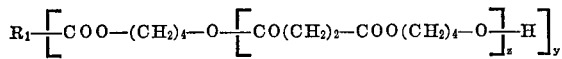

wherein $R_1$ denotes a hydrocarbon residue of a y-functional aliphatic, cycloaliphatic or aromatic polycarboxylic acid obtained by separating off the carboxylic groups, y denotes a number having a value of 3 or 4, preferably 3, and wherein the number z, which indicates the average number of structural elements

—CO—(CH$_2$)$_2$—COO—(CH$_2$)$_4$—O— per linear branched chain is so chosen that the average molecular weight of the polyester is about 1,2000 to about 10,000.

Polybasic polycarboxylic acids of formula $R_1(COOH)_y$ which serve as starting molecules are for example trimellitic acid, trimesic acid, aconitic acid, citric acid, tricarballylic acid and malic acid.

In order to manufacture the polyesters, the starting substances are mixed and heated, in the melt process, under a nitrogen atomsphere to 150–160° C. until the calculated hydroxy equivalent weight is reached and the acid equivalent weight is not less than 4000, but advantageously higher.

The products so otained still contain slight proportions of polyesters having both terminal hydroxyl groups and also terminal carboxyl groups.

A small proportion of another dicarboxylic acid, such as for example glutaric acid or adipic acid, and/or of another diol, such as propanediol or hexanediol, can also be incorporated in the polyesters, but the technical properties of the polyurethane plastics are as a rule worsened by such a modification. As diisocyanates (b) aliphatic, cycloaliphatic or araliphatic diisocyanates are preferably used. These compounds possess a lower reaction speed than the aromatic diisocyanates and are therefore particularly suitable for the manufacture of casting resins, since longer processing times are in part required in this type of application.

The following aliphatic, cycloaliphatic or araliphatic diisocyanates can be employed: ethylene-diisocyanate, trimethylene-diisocyanate, tetramethylene-diisocyanate, hexamethylene-diisocyanate, decamethylene-diisocyanate, 2,2,4- and 2,4,4-trimethylhexamethylene-diisocyanate or their technical mixtures; 1,4- or 1,3-cyclohexylene-diisocyanate, 2,4 or 2,6-hexahydrotoluylene-diisocyanate, 3,5,5-trimethyl - 3 - isocyanato - methyl - cyclohexane - isocyanate-(1) (="isophorone-diisocyanate"); 4,4' - dicyclohexyl - methane-diisocyanate; diisocyanates of formula

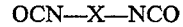

wherein X denotes the hydrocarbon residue of an optionally hydrogenated dimerised unsaturated fatty alcohol; o-, m- and p-xylylene-diisocyanate.

In application processes with short processing times aromatic diisocyanates can also be used with good results, such as for example: 2,4-toluylene-diisocyanate, 2,6-toluylene-diisocyanate, or their technical mixtures; 4,4'-diphenylmethane-diisocyanate, 1,5 - naphthalene - diisocyanate, 3,3'-dimethyl-biphenyl-4,4'-diisocyanate, 3,3'-dimethoxy-4,4'-diphenyl - diisocyanate, 3,3' - dichloro - diphenyl-4,4'-diisocyanate, 4,4'-diphenyl-diisocyanate, 4,4'-diphenyldimethylmethane-diisocyanate, p,p' - dibenzyl - diisocyanate, 1,4-phenylene-diisocyanate; 1,3-phenylene-diisocyanate, 2,3,5,6-tetramethyl-p-phenylene-diisocyanate; the uretdione-diisocyanates obtainable by dimerisation of aromatic diisocyanates, such as for example of 2,4-toluylene-diisocyanate, for example 1,3-bis-(4'-methyl-3'-isocyanato-phenyl)-uretdione of formula

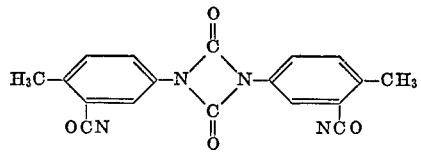

and N,N'-di-(4-methyl-3-isocyanate-phenyl)-urea.

Furthermore, the following diisocyanates can be employed: the addition products of 2 mols of 2,4-toluylene-diisocyanate to one mol of a glycol, as are treated by E. Müller in Houben-Weyl, 4th edition, Volume XIV/2 on pages 66 and 71–72, and the corresponding addition products of 2 mols of "isophorone-diisocyanate" to 1 mol of a glycol.

An additional crosslinking agent can optionally be conjointly used in the polyaddition reaction. Possible materials are either polyhydroxyl compounds containing at least 3 alcoholic hydroxyl groups or polyisocyanates containing at least 3 isocyanate groups.

In the optional choice of a polyhydroxyl compound (c) different from the polyester (a) as an additional crosslinking agent, the mutual ratio of the polyester (a) and the polyhydroxyl compound (c) should be so chosen that 1 equivalent of the total amount of hydroxyl group in the reaction mixture is composed of 0.95–0.50, preferably 0.9–0.7, equivalent of hydroxyl group of the slightly branched succinic acid-butane-1,4-diol polyester (a) and of 0.05 to 0.5, preferably 0.1 to 0.3, equivalent of hydroxyl group of the additional cross-linking polyhydroxyl compound (c).

Possible additional crosslinking agents (c) which possess at least 3 alcoholic hydroxyl groups are above all aliphatic or cycloaliphatic polyalcohols having 3 to 6 hydroxyl groups, such as for example glycerine, 1,1,1-trimethylolpropane, 1,1,1-trimethylolethane, hexane - 1,2,6-triol, hexane - 2,4,6 - triol, butane-1,2,4-triol, pentaerythritol, mannitol, sorbitol, 3,4,8 - trihydroxy-tetrahydro-dicyclopentadiene (=tricyclo - (5.2.1.0$^{2,6}$)-decane - 3,4,8-triol) and also the polyethers which are manufactured by reaction of the trihydroxy, tetrahydroxy or hexahydroxy compounds quoted above with a monoepoxide, such as ethylene oxide, propylene oxide, butylene oxide, isobutylene oxide, styrene oxide, phenyl glycidyl ether or cresyl glycidyl ether or mixtures of such monoepoxides or by the successive action of two or more of such monoepoxides. Furthermore, there may be mentioned the addition products of monoepoxides, especially alkylene oxides such as ethylene oxide or propylene oxide, to other polyfunctional starting molecules containing at least 3 active H-atoms; such polyfunctional compounds are, apart from the polyalcohols, above all tricarboxylic and tetracarboxylic acids, such as trimellitic acid, trimesic acid, aconitic acid, citric acid, tricarballylic acid and pyromellitic acid; and also polyphenols, such as phloroglucinol, polymethylolphenols, such as trimethylolphenol, and heterocyclic compounds containing OH groups or NH groups, such as cyanuric acid or isocyanuric acid.

As a rule, those additional crosslinking agents (c) which possess a hydroxyl equivalent weight of not greater than 300, preferably not greater than 100, are used. Such preferred crosslinking agents are above all low molecular trihydric saturated aliphatic alcohols, such as glycerine or hexanetriols, and also addition products of an average of 1 to 3 mols of a monoepoxide, such as ethylene oxide, propylene oxide or styrene oxide, to such triols.

In the optional choice of a polyisocyanate (d) containing at least 3 isocyanate groups as the additional crosslinking agent, the mutual ratio of the diisocyanate (b) and of the polyisocyanate (d) should be so chosen that in the reaction mixture 1 equivalent of the total amount of isocyanate group consists of 0.95–0.5, preferably 0.9 to 0.7, equivalent of isocyanate groups of the diisocyanate (b) and of 0.05 to 0.5, preferably 0.1 to 0.3, equivalent of isocyanate groups of the polyisocyanate (d).

As polyisocyanates (d) there may for example be mentioned:

1,3,5-benzene-triisocyanate,
2,4,6-toluylene-triisocyanate,
2,4,6-ethylbenzene-triisocyanate,
2,4,6-monochlorobenzene-triisocyanate,
4,4',4''-triphenylmethane-triisocyanate,
2,4,4'-diphenyl-triisocyanate,
4,4'-methylene-bis-(o-toluylene-diisocyanate),
thiophosphoric acid tris-(4-isocyanate-phenyl ester), and polymethylene-polyphenyl-polyisocyanates of formula

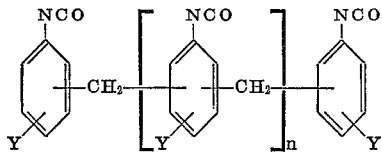

in which $n$ denotes 0 to 5 and Y denotes an alkyl or cycloalkyl residue, hydrogen atom, halogen atom or a nitrile group.

Further possibilities are triisocyanates and tetraisocyanates having a biuret structure, such as can for example be obtained by reaction of 3 to 4 mols of a diisocyanate with 1 mol of a diamine, for example an $\omega,\omega'$-diaminopolyether (compare German displayed specification 1,215,365).

Equally, triisocyanates or higher-functional polyisocyanates can be employed for the crosslinking which can be manufactured by addition of 1 mol per hydroxyl group of a diisocyanate, of which the two isocyanate groups possess different reactivity (for example 2,4-toluylene-diisocyanate or "isophorone-diisocyanate") to trihydroxy compounds or higher-functional polyhydroxyl compounds, for example trimethylolpropane or pentaerythritol.

However, the properties of the polyurethane plastics are as a rule not improved further by the addition of the crosslinking agents (c) or (d) which have been mentioned. In some cases, on the contrary, optimum technical results are obtained if the polyaddition reaction of the slightly branched polyester (a) with the diisocyanate (b) is carried out without the additional use of crosslinking agents.

It is of course possible also to add a part of an unbranched polyester to the branched polyester.

The reaction components (a) and (b) which are used, and possible additional crosslinking agents, are advantageously added in as pure a form as possible. The poly-addition reaction can also be carried out in the presence of accelerators; this is however not absolutely necessary. Possible catalysts are especially tertiary amines, such as pyridine, N,N' - dimethylpiperazine, N,N-dimethylbenzylamine, tributylamine, triethylamine, N-methylmorpholine, N-methylpyrrole, N-methyl pyrrolidine, diaza-(2.2.2)-bicyclooctane or diethyl - 2-hydroxyethylamine, and also metal salts, such as $FeCl_3$, $AlCl_3$, $ZnCl_2$, $SnCl_2$, $tin^{II}$-isooctoate, lead octoate, lead naphthenate and the dilaurate of tin-dibutyl. A survey of the customary catalysts is furthermore to be found in Houben-Weyl, 4th edition, volume XIV/2 on page 61 (reviewed by E. Miller).

As a rule the polyaddition reaction or crosslinking (curing) is carried out in the temperature range of 80 to 180° C., advantageously between 100 and 150° C.

In order to manufacture rigid foams it is furthermore possible conjointly to use, in a manner which is in itself known, blowing agents and surface-active substances, such as for example silicon compounds, as foam stabilisers.

Because of the relatively high processing temperatures possible blowing agents are above all substances which split off carbon dioxide or nitrogen at elevated temperature. Such substances are for example compounds containing carboxyl groups which on warming react with isocyanate groups to split off $CO_2$.

The manufacture, according to the invention, of crystalline polyurethane plastic products is as a rule carried out with simultaneous shaping to give castings, foamed articles, mouldings, lacquer films, laminates, adhesive bonds and the like. The procedure followed is that a mixture of the polyester (a) and the diisocyanate (b) together with optionally conjointly used additional crosslinking agent and/or catalyst and/or blowing agent, foam stabiliser and the like is manufactured; and that this mixture is then, after introduction into casting moulds or compression moulds, spreading as coatings, introduction into adhesive joints, and the like, allowed to react fully, with application of heat, to give the synthetic plastic.

A further subject of the present invention is therefore curable compositions which can, under the influence of heat, be converted into shaped articles or foamed articles including two-dimensional structures, such as coatings or adhesive joints, which contain (a) a slightly branched polyester possessing terminal hydroxyl groups, having an average molecular weight of about 1,200 to about 10,000, which is built up of 98 to 90 mol percent of the structural element of formula (I)   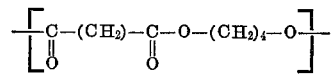

and (b) a diisocyanate, as well as, optionally, an additional crosslinking agent and/or a curing catalyst and/or blowing agents and foam stabilisers. In such a case 0.9 to 1.1 equivalents of isocyanate groups of the diisocyanate (b) are present in the mixture per 1 equivalent of hydroxyl group.

The linear polyester possessing terminal hydroxyl groups, the diisocyanate, the polyhydroxyl compounds (c) or polyisocyanate (d) optionally conjointly used as a crosslinking agent, as well as optional additives, can be easily mixed at elevated temperature to give a melt of low to medium viscosity having a relatively long period of use or "pot life." A particular advantage of the new curable compositions resides in the low temperature rise and the slight shrinkage on conversion into the crystalline plastic. As a result of this property it is possible to cast even large articles rapidly and to cure them without significant internal stresses. Shaped articles from the crystalline plastic products manufactured according to the invention can be stretched at room temperature and after stretching are reversibly deformable up to relatively high stresses.

It is of course possible to add, to the curable compositions, further usual additives for polyisocyanate curable composition, such as fillers, reinforcing agents, mould release agents, antioxidants, anti-aging agents, light protection agents, ultraviolet absorbers, flameproofing substances, optical brighteners, dyestuffs or pigments.

Suitable fillers or reinforcing agents are fibrous or pulverulent inorganic or organic substances. Quartz powder, aluminium oxide trihydrate, mica, aluminium powder, iron, powder, iron oxide, ground dolomite, chalk powder, gypsum, slate powder, unburnt kaolin (bolus), glass fibres, boron fibres, carbon fibres, asbestos fibres and especially fillers of high water absorbency, such as for example anhydrous silicon dioxide, anhydrous aluminium oxide, zeolites, bentonites and burnt kaolin may be mentioned.

The curable compositions can furthermore be used, in the filled or unfilled condition, as dipping resins, casting resins, laminating resins, impregnating resins, coating agents, sealing compositions, potting and insulating compositions for the electrical industry, or as adhesives. In addition to manual processing, the mechanised processing methods for the manufacture of polyurethane plastics can with advantage be employed which permit continuous mixing of the diisocyanates with the polyester containing hydroxyl groups to form a homogeneous melt. Thus the most diverse shaped articles (hard rubber substitute) can be manufactured by casting or centrifugal casting. Further applications exist in the field of casting compositions for pouring into joints or for sealing pipe couplings, and also as floor coverings or road coverings, as an impression composition or as adhesives. Unsupported foils, strips or filaments can be manufactured in a simple manner and impregnations or coatings of textiles, fibre mats (leather substitute) or paper can be carried out in a simple manner. The new curable compositions can, if the reaction speed is appropriately adjusted, for example be employed for lining containers or for the manufacture of endless tubes of any profile by means of continuously operating heated injection moulding machines. Rigid foams or hard foams manufactured from foamed compositions according to the invention are for example employed as insulating substances for buildings and refrigeration installations, as packaging materials and especially for shock absorption, for example as vibration-damping constructional components in the construction of automobiles and machinery.

In the examples which follow, percentages denote percentages by weight unless otherwise stated. The following slightly branched polyesters containing hydroxyl groups were used for the manufacture of crystalline polyurethane plastics described in the examples.

Polyester A 600.0 g. (6 mols) of succinic anhydride, 540.0 g. (6 mols) of butane-1,4-diol and 44.7 g. (0.33 mol) of 1,1,1-trimethylolpropane were mixed and heated for 50 hours to 170° C. under a nitrogen atmosphere, in the course of which 110 ml. of water distilled off. Thereafter 10 g. of butane-1,4-diol were added and the mixture allowed to continue to react for 14 hours under the same conditions. After this the reaction was continued for 10 hours at 170° C. under a water-jet vacuum. A colourless crystalline polyester resulted which had the following characteristics:

Melting point = 98° C.
Acid equivalent weight = 7315
Hydroxyl equivalent weight = 1090

Polyester B 600.0 g. (6 mols) of succinic anhydride, 540.0 g. (6 mols) of butane-1,4-diol and 45.4 g. (0.33 mol) of pentaerythritol were mixed and allowed to react for 44 hours under a nitrogen atmosphere and subsequently for 6 hours under a water-jet vacuum at 170° C. A colourless crystalline polyester with the following characteristics was obtained:

Melting point = 100° C.
Acid equivalent weight = 8537
Hydroxyl equivalent weight = 693

Polyester C 9.6 g. (0.05 mol) of trimellitic anhydride, 266.2 g. (2.9 mols plus 2.0% excess) of butane-1,4-diol and 275.0 g. (2.75 mols) of succinic anhydride (corresponding to a molar ratio of tricarboxylic acid:diol:dicarboxylic acid of 1:58:55) were mixed in a sulphonation flask equipped with a descending condenser and heated to 160°–165° C. under a nitrogen atmosphere after the addition of 0.5 ml. of pyridine. The elimination of water, which starts rapidly, yielded 48.1 g. (theory, 51.3 g.) of condensate, which also contained tetrahydrofuran, after 12 hours. The esterification was now continued under 55 mm. Hg at the same temperature and the acid equivalent weight and hydroxyl equivalent weight were determined at intervals. After a total of 96 hours reaction time the reaction product had an acid equivalent weight of 8315 and a hydroxyl equivalent weight of 3245 (theory 3295), after which the reaction was stopped. The product solidified at room temperature to give a light brown-coloured crystalline mass which in the Differential Scanning Calorimeter showed two crystallisation transition temperatures of 108° C. and 115° C.

Polyester D 9.2 g. (0.1 mol) of glycerine, 278.1 g. (3 mols plus 3% excess) of butane-1,4-diol and 300.0 g. (3.0 mols) of succinic anhydride (corresponding to a molar ratio of triol:diol:dicarboxylic acid of 1:30:30) were mixed in a sulphonation flask equipped with a descending condenser and heated to 160°–165° C. for 12 hours in a nitrogen atmosphere after the addition of 0.5 ml. of pyridine. Hereupon 46 g. (theory 54.0 g.) of water had been split off after 12 hours. Thereafter the mixture was allowed to continue to react at the same temperature in vacuo, initially for 2 hours under 50–55 mm. Hg and subsequently under 16–20 mm. Hg, and at intervals of 4 hours the acid equivalent weight and, after it had exceeded a value of 8000, also the hydroxyl equivalent weight were determined. After a further 74 hours reaction time the acid equivalent weight was 12,680 and the hydroxyl equivalent weight 1591 (theory 1751), after which the reaction was stopped. The product solidified at room temperature to give a light brown crystalline mass. Two crystallisation transition temperatures of 101° C. and 112° C. were measured in the Differential Scanning Calorimeter.

EXAMPLE 1

1090 g. (=1.0 equivalent) of polyester A were warmed to 140° C. with 13.2 g. of 3-hydroxymethyl-2,4-dihydroxypentane (=0.3 equivalent), mixed with 169 g. (1.5 equivalents) of 3,5,5 - trimethyl-5-(isocyanato-methyl)-cyclohexane-isocyanate-(1) (="isophorone-diisocyanate") and well mixed. The mixture was subjected to a vacuum at 110° C. for 5 minutes in order to remove air bubbles and moisture. The mixture was poured into prewarmed moulds of an aluminum alloy (registered trade name "Anticorrodal") of internal dimensions 140 x 140 x 2 mm. which had been treated with a silicone release agent, and was subjected to a heat treatment of 16 hours at 140° C. Test specimens according to VSM 77,101 (revised; test specimens No. 2) (corresponding to ISO Recommendation R 527, test specimens No. 2 and DIN 53,455, test specimens No. 2) for the tensile test were punched from the 2 mm. thick sheets. The term VSM is an official abbreviation for Verein Schweizerischer Maschinenindustrieller. The crystallisation transition temperature was determined by means of a Differential Scanning Calorimeter ("DSC 1" of Messrs. Perkin Elmer) using a heating speed of 80° C.

per minute. On warming a resin at uniform speed, an intense absorption of energy by the resin occurs on melting of the crystals within a relatively small temperature range. The temperature at which the energy absorption is greatest (maximum of the endothermic eruption) is designated the crystallisation transition temperature (CTT).

The mouldings had the following properties:

Tensile strength (unstretched) according to VSM 77,101: 2.5 kg./mm.$^2$
Elongation at break (unstretched) according to VSM 77,101: 150%
Tensile strength after stretching to 130% (VSM 77,101): 4.0 kg./mm.$^2$
Elongation at break after stretching to 130% (VSM 77,101: 43%
Crystallisation transition temperature: 79° C.

EXAMPLE 2

(a) 693 g. (1.0 equivalent) of polyester B were warmed to 140° C., well mixed with 101 g. of hexamethylene-diisocyanate (=1.03 equivalent) and poured at 110° C., after brief subjection to a vacuum, into the moulds according to Example 1. After a heat treatment of 16 hours at 140° C. mouldings with the following properties were obtained:

Tensile strength after stretching at 95° C. (VSM): 6.00 kg./mm.$^2$
Elongation at break after stretching at 95° C. (VSM): 55%
Crystallisation transition temperature. 91° C.

(b) On using 133 g. (=1.18 equivalents) of 3,5,5-trimethyl - 5 - (isocyanatomethyl)-cyclohexane-isocyanate-(1) ("isophorone-diisocyanate") instead of hexamethylene-diisocyanate and otherwise the same composition and processing of the moulding composition as in Example 2(a), the following properties of the mouldings were measured:

Tensile strength after stretching at 95° C. (VSM): 7.5 kg./mm.$^2$
Elongation at break after stretching at 95° C. (VSM): 40%
Crystallisation transition temperature: 84° C.

The moulding compositions described above in Example 2(a) and (b), which consist of diisocyanate and slightly branched succinic acid-butane-1,4-diol polyester without the addition of triols, show a lesser tendency to the evolution of bubbles during curing than if triols are conjointly used as additional crosslinking agents, and are therefore particularly suitable for use as casting resins.

EXAMPLE 3

324.5 g. of polyester C were warmed to 120° C. and subjected to a vacuum at 20 mm. Hg for 20 minutes. Thereafter the polyester was warmed to 140° C. and well mixed with 12.3 g. of 3,5,5-trimethyl-5-(isocyanatomethyl)-cyclohexane - isocyanate - (1) ("isophorone-diisocyanate") (corresponding to 1.1 equivalents is isocyanate per 1.0 equivalent of hydroxyl of the polyester), and after further brief subjection to a vacuum in order to remove the air bubbles, the mixture was poured into the 1 mm. thick moulds according to Example 1. After a heat treatment of 16 hours at 140° C., crystalline, rubbery-elastic mouldings of high toughness were obtained. The following properties were measured:

Tensile strength according to ISO (unstretched): 280 kg./cm.$^2$
Elongation at break according to ISO (unstretched): 340%
Tensile strength according to ISO (stretched):* 1230 1230 kg./cm.$^2$
Elongation at break according to ISO (stretched):* 65%
Crystallisation transition temperature: 113° C.

EXAMPLE 4

(a) 159.1 g. of polyester D together with 14.0 g. of diphenylmethane-4,4'-diisocyanate (corresponding to 1.1 equivalents of isocyanate per 1.0 equivalent of hydroxyl of the polyester) were processed in the same manner as in Example 3, and cured. Test specimens having the following properties were obtained:

Tensile strength according to ISO (unstretched): 320 kg./cm.$^2$
Elongation at break according to ISO (unstretched): 420%
Tensile strength after stretching as in Example 3: 1300 kg./cm.$^2$
Elongation at break after stretching as in Example 3: 75%
Crystallisation transition temperature: 100° C.

(b) When using 1.0 equivalent of a diisocyanate which had been obtained by the addition of 4 mols of 2,4-toluylene-diisocyanate to 2 mols of ethylene glycol (diisocyanate A) instead of 1.1 equivalents of 4,4'-diphenylmethane-diisocyanate, and otherwise the same composition and processing as in Example 4(a), mouldings with the following properties were obtained:

Tensile strength according to ISO (unstretched): 260 kg./cm.$^2$
Elongation at break according to ISO (unstretched): 400%
Tensile strength after stretching as in Example 3: 1200 kg./cm.$^2$ (breaks at the head)
Elongation at break after stretching as in Example 3: 35% (breaks at the head)
Crystallisation transition temperature: 104° C.

The diisocyanate A used in Example 4(b) was manufactured as follows:

Diisocyanate A 124.0 (2.0 mols) of ethylene glycol were added dropwise to 696.0 g. (4.0 mols) of 2,4-toluylene-diisocyanate over the course of 30 minutes in such a way that with moderate cooling the temperature in the reaction mixture was always kept between 40° C. and 45° C. by the exothermic reaction. The initially cloudy reaction mixture became homogeneous towards the end of the period of addition. After completion of the addition the temperature in the reaction mixture was allowed to rise to 100° C. by removing the cooling, after which, following a short period of reaction, the product began to crystallise. The crude product showed a melting point of 111–119° C. and an isocyanate equivalent weight of 209 (theory 205). This product was employed in Example 4(b) without further purification.

EXAMPLE 5

159.1 g. of polyester D were warmed to 180° C. and subjected to a vacuum at 12 mm. Hg for 1 hour. After cooling to 140° C., 12.3 g. of "isophorone-diisocyanate" (corresponding to 1.1 equivalents of isocyanate per 1.0 equivalent of hydroxyl of the polyester) were added in vacuo and the whole was well mixed. The vacuum was now released by means of dry nitrogen and the reaction product poured, under a nitrogen atmosphere, into the prewarmed 1 mm. moulds according to Example 1. After

*The ISO test specimens were first warmed to 120° C. and stretched up to about 400%. Thereafter they were slowly cooled whilst stretched in this way. When crystallisation started, they were further stretched to 800% and cooled to room temperature under constant tensile stress. The measurements were carried out on the mouldings thus obtained.

a heat treatment of 16 hours at 140° C. mouldings with the following properties were obtained:

Tensile strength according to ISO (unstretched): 350 kg./cm.²
Elongation at break according to ISO (unstretched): 500%
Tensile strength after stretching as in Example 3: 1650 kg./cm.²
Elongation at break after stretching as in Example 3: 75%
Crystallisation transition temperature: 101° C.

We claim:
1. A curable composition consisting of polyhydroxyl compounds and a diisocyanate, which can be converted by heating into a high molecular crystalline polyurethane product having a crystallization transition temperature of above about 80° C., said curable composition of matter comprises
(a) a branched polyester having an acid equivalent weight not less than 4000, possessing terminal hydroxyl groups, and which has the average formula

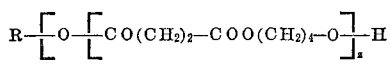

wherein R denotes the hydrocarbon residue of a $y$ functional aliphatic or cycloaliphatic polyalcohol obtained by removing the hydroxyl groups, $y$ is 3 or 4 and $z$ is at least 2 and is additionally so chosen that the average molecular weight of the polyester is about 1,200 to about 10,000 and (b) a diisocyanate, with 0.9 to 1.1 equivalents of isocyanate groups of the diisocyanate (b) being present in each case in the composition per 1 equivalent of hydroxyl group.

2. A thermocurable composition as claimed in claim 1 which contains a polyester (a) of average formula

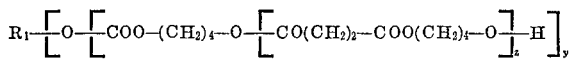

wherein $R_1$ denotes the hydrocarbon residue of a $y$-functional aliphatic, cycloaliphatic or aromatic polycarboxylic acid obtained by removing the carboxyl groups, $y$ denotes a number having a value of 3 or 4, and wherein the number $z$, which indicates the average number of structural elements —CO(CH₂)₂—COO(CH₂)₄—O— per linear branched chain is so chosen that the average molecular weight of the polyester is about 1,200 to about 10,000.

3. A composition as claimed in claim 2 which additionally contains, as a further crosslinking agent, a polyhydroxyl compound (c) which contains at least 3 hydroxyl groups and is different from the polyester (a) containing hydroxyl groups, with 1 equivalent of the total amount of hydroxyl group in the composition consisting of 0.95 to 0.50 equivalent of hydroxyl group of the branched succinic acid-butane-1,4-diol polyester (a) and of 0.05 to 0.5 equivalent of hydroxyl group of the additional crosslinking polyhydroxyl compound (c).

4. A composition as claimed in claim 3 which additionally contains, as a further crosslinking agent, a polyhydroxyl compound (c) which contains at least 3 hydroxyl groups and is different from the polyester (a) containing hydroxyl groups, with 1 equivalent of the total amount of hydroxyl group in the composition consisting of 0.9 to 0.7 equivalent of hydroxyl group of the branched succinic acid-butane-1,4-diol polyester (a) and of 0.1 to 0.3 equivalent of hydroxyl group of the additional crosslinking polyhydroxyl compound (c).

5. A composition as claimed in claim 3 which contains, as the additional crossliking component (c), a polyhydroxyl compound containing at least 3 alcoholic hydroxyl groups, having a hydroxyl equivalent weight not greater than 300.

6. A composition as claimed in claim 5 which contains, as the additional crosslinking component (c), a polyhydroxyl compound containing at least 3 alcoholic hydroxyl groups, having a hydroxyl equivalent weight not greater than 100.

7. A composition as claimed in claim 3 which contains, as the additional crosslinking component (c), low molecular trihydric or tetrahydric saturated aliphatic polyalcohols or the polyether-alcohols obtained by addition of 1 to 3 mols of a low molecular monoepoxide to such polyalcohols.

8. A composition as claimed in claim 1 which furthermore contains, as an additional crosslinking agent, a polyisocyanate (d) containing at least 3 isocyante groups, with 1 equivalent of the total amount of isocyanate groups in the composition being composed of 0.95 to 0.5 equivalent of isocyanate groups of the diisocyanate (b) and of 0.05 to 0.5 equivalent of the isocyanate group of the polyisocyanate (d).

9. A composition as claimed in claim 8 which furthermore contains, as an additional crosslinking agent, a polyisocyanate (d) containing at least 3 isocyanate groups, with 1 equivalent of the total amount of isocyanate groups in the composition being composed of 0.9 to 0.7 equivalent of isocyanate groups of the diisocyanate (b) and of 0.1 to 0.3 equivalent of the isocyanate group of the polyisocyanate (d).

10. A composition as claimed in claim 1 which contains an aliphatic, cycloaliphatic or aryliphatic diisocyanate as the diisocyanate (b).

11. A composition as claimed in claim 10 which contains hexamethylene-diisocyanate or 3,5,5-trimethyl-5-(isocyanato-methyl)-cyclohexane-isocyanate-(1) as the diisocyanate (b).

12. A composition as claimed in claim 1 which contains an aromatic diisocyanate as the diisocyanate (b).

13. A composition as claimed in claim 12 which contains 2,4-toluylene-diisocyanate or 2,6-toluylene - diisocyanate as the diisocyanate (b).

14. A composition as claimed in claim 12 which contains 4,4'-diphenylmethane-diisocyanate as the diisocyanate (b).

15. A composition as claimed in claim 1 which contains an addition product which has been obtained by addition of 4 mols of 2,4-toluylene-diisocyanate to 2 mols of ethylene glycol as the diisocyanate (b).

16. A composition as claimed in claim 1 which contains a catalyst.

References Cited
UNITED STATES PATENTS

| | | | |
|---|---|---|---|
| 2,621,166 | 12/1952 | Schmidt et al. | 260—75 |
| 2,729,618 | 1/1956 | Mueller et al. | 260—75 |
| 2,741,800 | 4/1956 | Brockway | 18—58 |
| 2,753,319 | 7/1956 | Brockway | 260—30.6 |
| 2,779,689 | 1/1957 | Reis | 117—164 |
| 2,811,493 | 10/1957 | Simon et al. | 260—2.5 |
| 2,888,432 | 5/1959 | Fauser | 260—45.4 |
| 2,929,800 | 3/1960 | Hill | 260—77.5 |
| 2,953,539 | 9/1960 | Keplinger et al. | 260—31.6 |
| 2,981,719 | 4/1961 | Muehlhausen et al. | 260—75 |
| 3,248,373 | 4/1966 | Barringer | 260—77.5 |
| 3,352,830 | 11/1967 | Schmitt et al. | 260—77.5 |

OTHER REFERENCES

Lenz: Organic Chemistry of Synthetic High Polymers, Interscience, New York (1967), pp. 5–19.

DONALD E. CZAJA, Primary Examiner

H. S. COCKERAM, Assistant Examiner

U.S. Cl. X.R.

161—190; 260—2.5 AK, 2.5 AM, 18 TN, 37 N, 75 NK, Dig. 35